Oct. 8, 1957  R. W. BROWN  2,808,753
LOADING MECHANISM
Filed Aug. 18, 1953  3 Sheets-Sheet 3
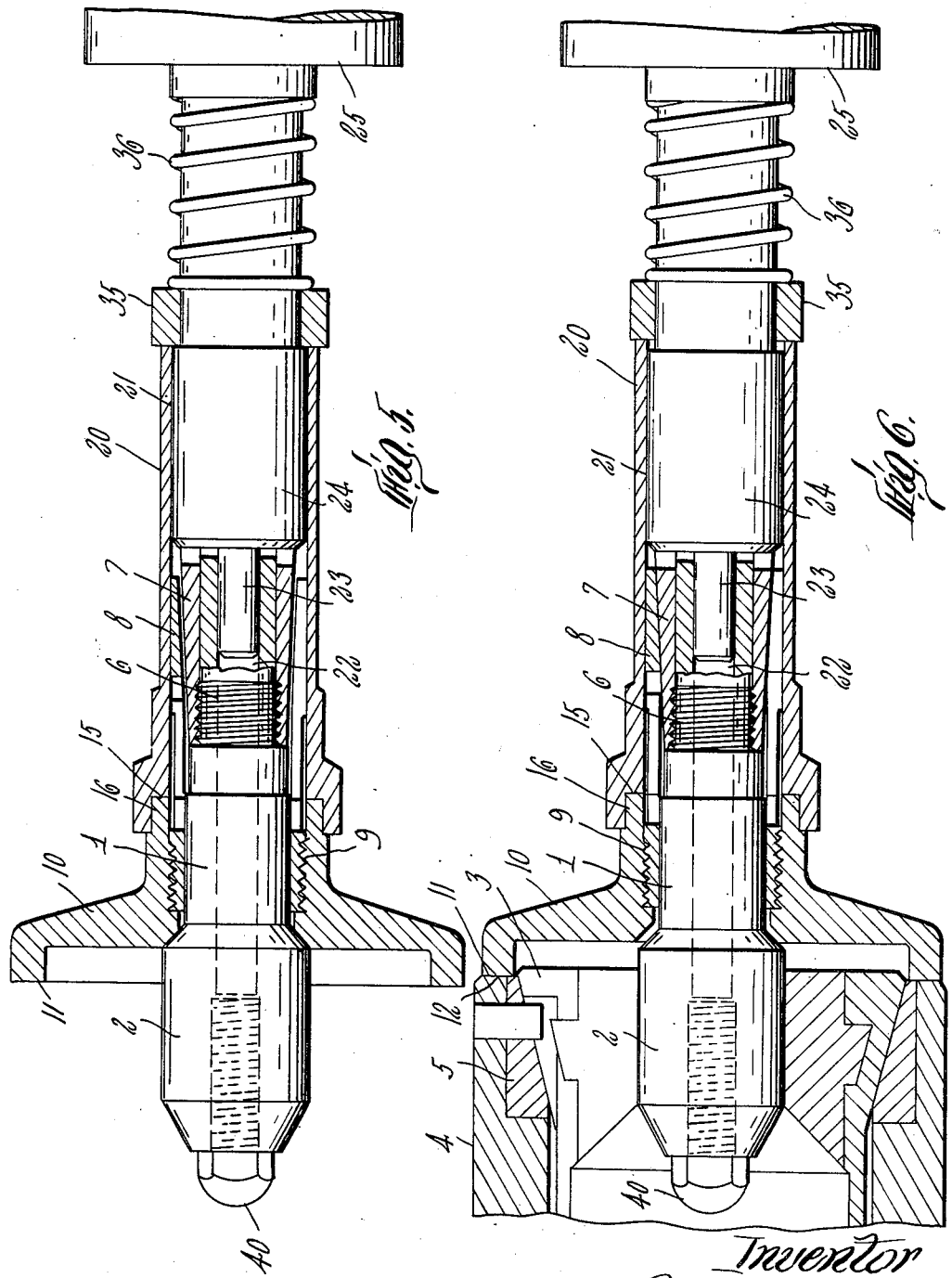
Inventor
Roger W. Brown

United States Patent Office 2,808,753
Patented Oct. 8, 1957

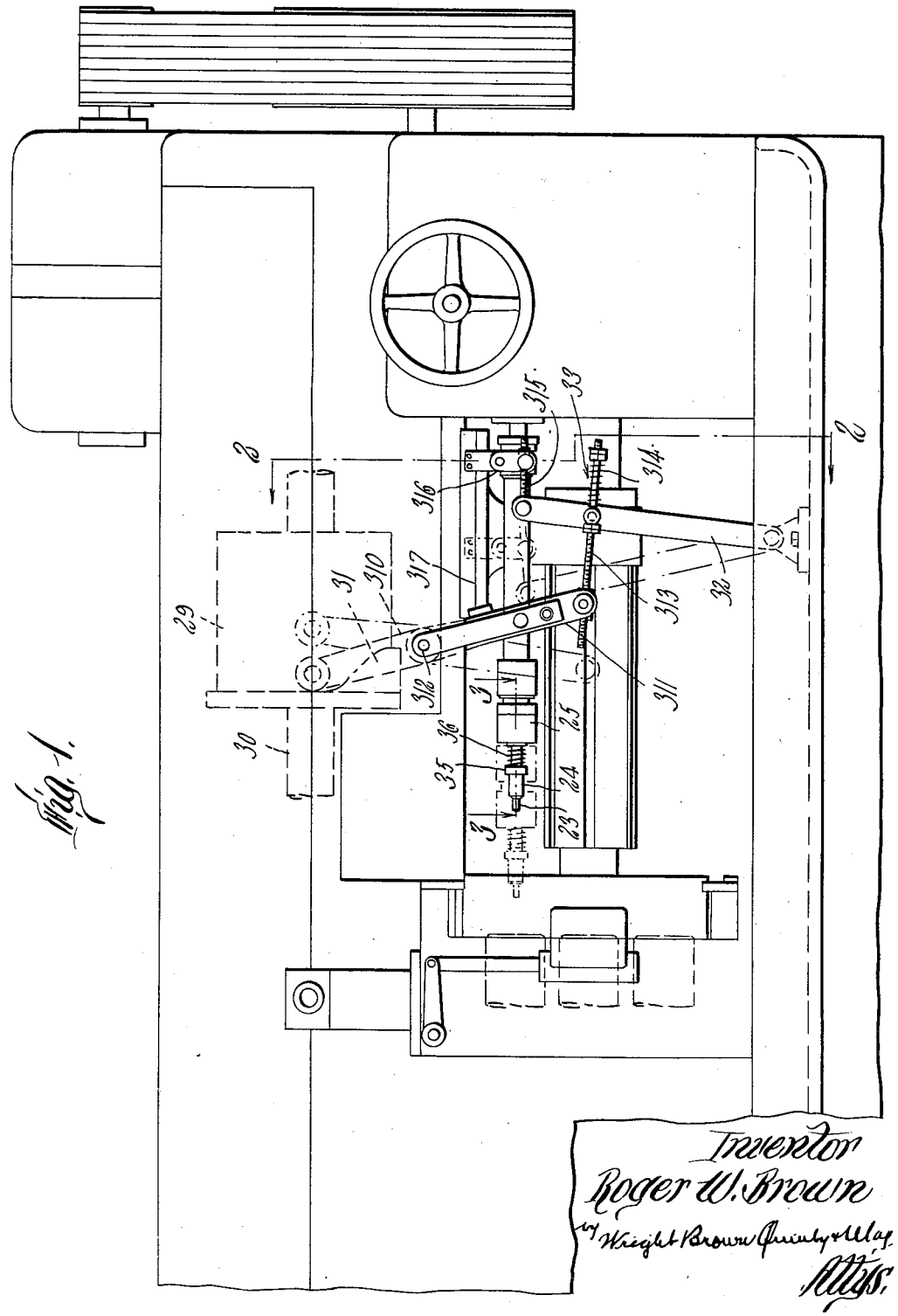

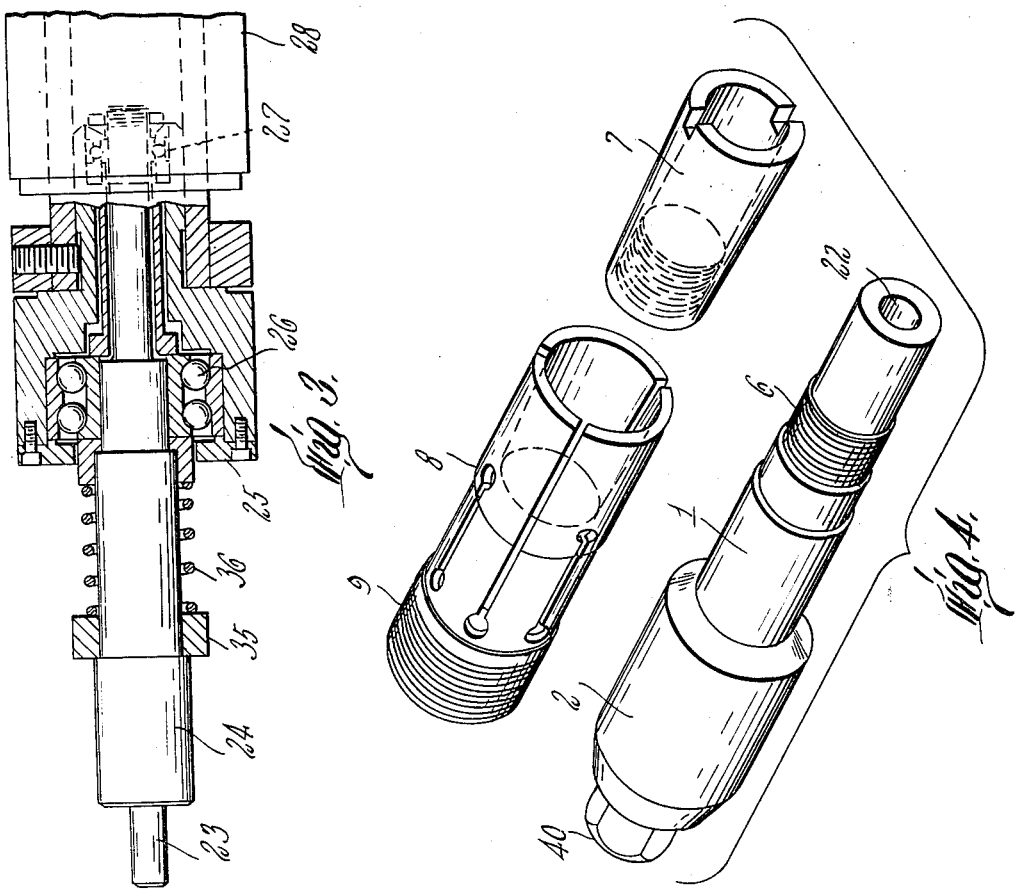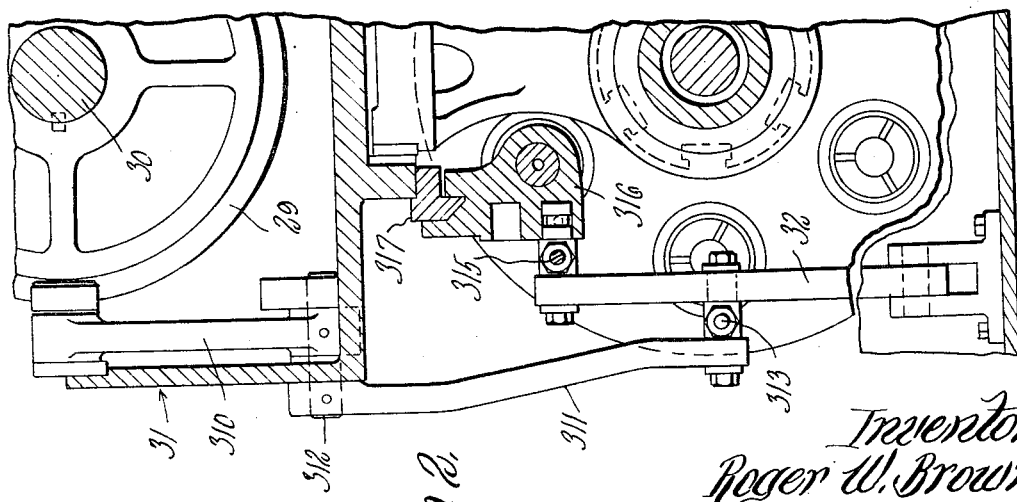

2,808,753
LOADING MECHANISM

Roger W. Brown, Windsor, Vt., assignor to Cone Automatic Machine Company Inc., Windsor, Vt., a corporation of Vermont Application August 18, 1953, Serial No. 374,935

2 Claims. (Cl. 82—44)

This invention relates to mechanism for loading work pieces with respect to spindles of a bar stock machine, as for a second operation after a first operation wherein the work piece is cut off from the bar stock, and while the spindles continue to rotate, and more particularly where the work piece is to be gripped internally.

An object of the invention is to provide means for correctly holding the work piece on an expansible arbor without the necessity of employing any special stop spindles or chucking means for the second operation which hitherto has required a second machine. It thus increases the versatility of the bar stock machine without change of its basic elements.

It has for certain other objects to provide such a mechanism wherein each work piece is located accurately and in the same relation to the tools as each of the other work pieces, and wherein each work piece is gripped tightly enough so as not to turn relative to its spindle during the subsequent tooling operations thereon.

The foregoing objects are attained by the use of an expansible arbor on which the work piece is loaded, the arbor being provided with an extension of a size to be gripped by the collet of the machine, the work piece and expansible arbor being loaded simultaneously.

For a complete understanding of this invention, reference may be had to the accomanying drawings in which Figure 1 is a somewhat diagrammatic front elevation of a multiple spindle lathe embodying the invention.

Figures 2 and 3 are detail sectional views to a larger scale on lines 2—2 and 3—3, respectively, of Figure 1.

Figure 4 is an exploded perspective view of certain of the work piece carrying parts.

Figure 5 is a longitudinal view partly in side elevation and partly broken away and in section showing a work piece supported on a mandrel in preparation for being clamped thereto.

Figure 6 is a view somewhat similar to Figure 5, but showing the work piece clamped to the machine spindle ready for the second set of machining operations.

Referring first to Figures 5 and 6, there is illustrated a tubular mandrel 1 having an end extension 2 adapted to be inserted into the work gripping means, herein shown as a collet 3, of a rotary spindle 4 to be gripped therein in place of bar stock. This gripping is accomplished by usual means such as a collet-actuating sleeve which is actuated at suitable times to move the collet axially and cause it to be wedged into engagement with the work by the action of cooperating tapered faces on the collet and the collet wedging element 5 as is well known in the art. The mandrel 1, as shown, is provided with a threaded outer portion 6 to which is secured, as by screwing thereon, the inner end of a draw plug 7. This draw plug, as shown, is externally tapered with its larger diameter end being toward the outer end of the mandrel and engaged thereon are the fingers of an expansible collet 8. The inner end of this collet 8 is secured as by threads 9 to an adapter 10. The collet 8 and adapter 10 are slidable as a unit on the mandrel 1. This adapter 10 is provided with a rear end face 11 perpendicular to the axis of the spindle and which at suitable times may be engaged with a mating end face 12 of the spindle as shown in Figure 6. This adapter also has an opposite end face 15 on a reduced diameter portion 16 which is arranged to be engaged by the inner end of the work piece 20 upon which machining operations are to be performed. This work piece 20 has an internal surface 21 adapted to be engaged by the expanding collet 8.

The outer end of the mandrel is provided with a central bore 22 so that it may be placed over the reduced diameter end 23 of a loading plunger 24. This plunger 24 is a part of a loading spindle 25 which is mounted for rotation and axial motion as shown in Figure 1, 2 and 3.

Figure 3 shows the mounting of this spindle for free rotation in the bearings 26 and 27 in a carrier 28 which is given axial motion from a cam 29 on a cam shaft 30 through linkage indicated generally at 31 and which is connected to a pivoted arm 32 through a yielding connection at 33. As shown in Figures 2 and 3 this linkage comprises arms 310 and 311 secured to a pivot shaft 312 and connected through a threaded rod 313 and spring 314 to the pivoted arm 32. This arm 32 is connected through an adjustable link 315 to a carriage 316 slidably mounted on a guide bar 317. Nuts on the rod 313 limit the yielding motion, and nuts on the link 315 adjust its effective length.

The work piece 20 to be machined is placed over the mandrel as shown in Figure 5 and the mandrel with the parts carried thereby is then placed over the portion 23 of the loading spindle 24. The loading spindle is then moved by the cam 29 toward the rotary spindle, presenting the extension end 2 into a rotary spindle into the work gripping means thereof. As the loading spindle advances, a collar 35 thereon backed up by a coil spring 36 presses against the outer end of the work piece 20 and forces this work piece axially into engagement with the end of the adapter, and the adapter against the face 12 of the rotary spindle. The forward face of the loading plunger 24 also engages the outer end of the draw plug 7 and presses this draw plug and the mandrel inwardly, expanding the collet 8 into clamping engagement with the work piece, and forces the mandrel end 2 well into the spindle work-gripping mechanism. The machine spindle gripping means is then closed upon the mandrel extension in the normal cycle of operations of the machine and the loading spindle is withdrawn and remains out of action until the part has been machined and another mandrel with a work piece thereon is placed thereon ready to be moved forward with the next cycle of operations.

When the work piece has been machined, the usual pusher tube associated with the rotary machine spindle and operated by the stop feed ejects the mandrel with the work piece still held thereon by the expanding collet 8. To release the work, the operator grips the finished part of the work and strikes the end of the extension 2 which is provided with a bolt head 40 for this purpose, against a lead block or bench. This drives the mandrel axially in a direction to move the draw block 7 out of position to hold the collet 8 in clamping relation to the work and thus releases the work, which can then be removed therefrom.

It will be noted that there are two hand operations involved, the one which consists in placing the work piece onto the mandrel and the mandrel and work piece onto the loading spindle. From there on the operation is automatic until the mandrel with the work piece is ejected, whereupon the operator then releases the work piece therefrom by hand.

From the foregoing description of an embodiment of this invention it should be evident to those skilled in the art that various changes and modifications may be made therein without departing from its spirit or scope.

I claim:

1. In combination with a rotary spindle having means for gripping a work piece coaxial therewith, of a work holding device comprising a mandrel having an end portion adapted to be engaged in said spindle gripping means, an expansible collet carried by said mandrel adapted to engage the inner face of a work piece held on said mandrel, a draw plug movable axially of said mandrel, said plug and collet having cooperative tapered faces causing said collet to engage said inner face on relative axial motion in one direction between said mandrel and plug, a loading spindle movable coaxially of said spindle and having means engageable with one end of said mandrel, and means for moving said loading spindle with said mandrel and a work piece thereon toward said rotary spindle to insert said mandrel end portion into said work gripping means and to engage and move said plug relative to said mandrel to cause said expanding collet to grip said work piece.

2. In combination with a rotary spindle having an outer end face perpendicular to the axis of said spindle and having means for gripping a work piece coaxial therewith, of a work holding device comprising a mandrel having an end portion adapted to be engaged in said spindle gripping means, an expansible collet carried by said mandrel adapted to engage the inner face of a work piece held on said mandrel, a draw plug movable axially of said mandrel, said plug and collet having cooperating tapered faces causing said collet to engage said inner face on relative axial motion in one direction between said mandrel and plug, an adapter movable axially on said mandrel and having an end face adapted to engage said spindle end face and an end face adapted to be engaged by a work piece on said mandrel, said adapter being fixed to said draw plug, a loading spindle movable coaxially of said spindle and having means engaging one end of said mandrel and means yieldingly engaging said work piece, and means for moving said loading spindle with said mandrel and a work piece thereon toward said rotary spindle to press said work piece yieldingly against said adapter and said adapter against said spindle end face and said plug relative to said expansible collet to grip said work piece and to insert said end portion into said spindle gripping means.

References Cited in the file of this patent

UNITED STATES PATENTS

| | | |
|---|---|---|
| 1,467,821 | Tuttle | Sept. 11, 1923 |
| 1,944,255 | McFall | Jan. 23, 1934 |
| 2,097,646 | Rupple | Nov. 2, 1937 |
| 2,360,968 | Mundy | Oct. 24, 1944 |
| 2,379,210 | Alyea | June 26, 1945 |
| 2,698,551 | Olsen | Jan. 4, 1955 |